US008522029B2

(12) United States Patent
Agrawal et al.

(10) Patent No.: US 8,522,029 B2
(45) Date of Patent: Aug. 27, 2013

(54) SECRET-KEY EXCHANGE FOR WIRELESS AND SENSOR NETWORKS

(75) Inventors: Dakshi Agrawal, Monsey, NY (US); Chatschik Bisdikian, Chappaqua, NY (US); Cagatay Capar, Sunderland, MA (US); Rosario Gennaro, Bronx, NY (US); Hugo M. Krawczyk, Tarrytown, NY (US); Tal Rabin, Riverdale, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/850,948

(22) Filed: Aug. 5, 2010

(65) Prior Publication Data

US 2012/0036362 A1     Feb. 9, 2012

(51) Int. Cl.
H04L 9/32     (2006.01)
(52) U.S. Cl.
USPC ............................................ 713/171; 380/44
(58) Field of Classification Search
USPC ............................................ 713/171; 380/44
See application file for complete search history.

(56) References Cited

U.S. PATENT DOCUMENTS

| | | | | |
|---|---|---|---|---|
| 5,105,435 A * | 4/1992 | Stilwell | ........................ | 375/144 |
| 5,235,616 A * | 8/1993 | Sebilet | ........................ | 375/141 |
| 5,268,926 A * | 12/1993 | Sebilet | ........................ | 375/142 |
| 5,953,420 A * | 9/1999 | Matyas et al. | ................ | 713/171 |
| 7,233,664 B2 | 6/2007 | Soliman | | |
| 7,302,252 B2 | 11/2007 | Okochi | | |
| 7,607,012 B2 | 10/2009 | Nyberg | | |
| 2001/0006892 A1* | 7/2001 | Barnett et al. | ................ | 455/434 |
| 2001/0032232 A1* | 10/2001 | Zombek et al. | ............... | 709/201 |
| 2002/0032853 A1* | 3/2002 | Preston et al. | ................ | 713/151 |
| 2006/0045267 A1 | 3/2006 | Moore et al. | | |
| 2006/0282675 A1* | 12/2006 | Yao | .................. | 713/176 |
| 2007/0264973 A1 | 11/2007 | Dowek et al. | | |

(Continued)

FOREIGN PATENT DOCUMENTS

WO     WO2008/122906 A1     10/2008
WO     WO2009/145733 A1     12/2009

OTHER PUBLICATIONS

Cooperative Jamming in MIMO Ad-Hoc Networks, Jianqi Wang and A. Lee Swindlehurst, Nov. 1-4, 2009, pp. 1719-1723, Signals, Systems and Computers, 2009 Conference Record of the Forty-Third Asilomar Conference on Diffie-Hellman key exchange Wikipedia, Mar. 25, 2009, p. 1-4.*

(Continued)

*Primary Examiner* — Brian P Whipple
(74) *Attorney, Agent, or Firm* — Francis Lammes; Stephen J. Walder, Jr.; Preston J. Young

(57)     ABSTRACT

A mechanism is provided for establishing a shared secret-key for secure communication between nodes in a wireless network. A first node in the wireless network provides a spreading code to a second node of the wireless network. The second node provides a first input for the key establishment to the first node using communication encoded with the spreading code. Responsive to obtaining the first input from the second node, the first node provides a second input for the key establishment to the second node using communication encoded with the spreading code. Then, the first node and the second node establish the shared secret-key using the first input and the second input.

25 Claims, 5 Drawing Sheets

(56) References Cited

U.S. PATENT DOCUMENTS

| | | | |
|---|---|---|---|
| 2009/0228708 A1* | 9/2009 | Trostle | 713/171 |
| 2009/0287929 A1 | 11/2009 | Kolesnikov et al. | |
| 2011/0002463 A1* | 1/2011 | Michaels et al. | 380/268 |
| 2011/0019817 A1* | 1/2011 | Michaels et al. | 380/38 |

OTHER PUBLICATIONS

"Diffie-Hellman key exchange", http://en.wikipedia.org/wiki/Diffie%E2%80%93Hellman_key_exchange, Wikipedia, printed Aug. 5, 2010, 5 pages.

Lee, Jooyoung et al., "On the Construction of Practical Key Predistribution Schemes for Distributed Sensor Networks Using Combinatorial Designs", ACM Transaction on Information and Systems Security, vol. 11, No. 2, Article 5, Pub. date: May 2008, 35 pages.

Qazi, S et al., "Securing Wireless Mesh Networks with Ticket-Based Authentication", IEEE, 2008 2nd International Conference on Signal Processing and Communication Systems, ICSPCS '2008, 10 pages.

Sabbah, Eric et al., "An Application-Driven Perspective on Wireless Sensor Network Security", ACM, Q2SWinet '06, Oct. 2, 2006, 8 pages.

\* cited by examiner

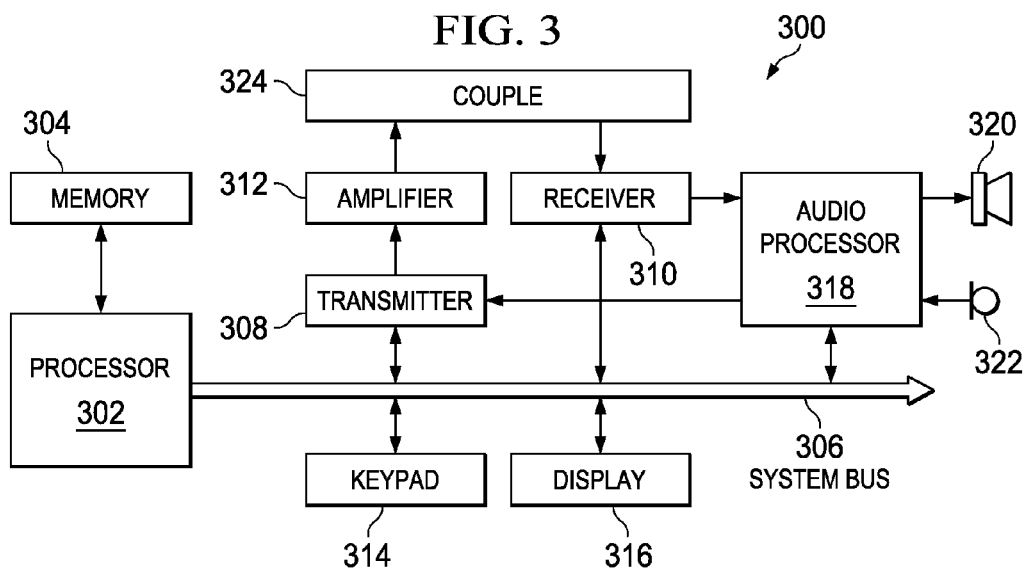
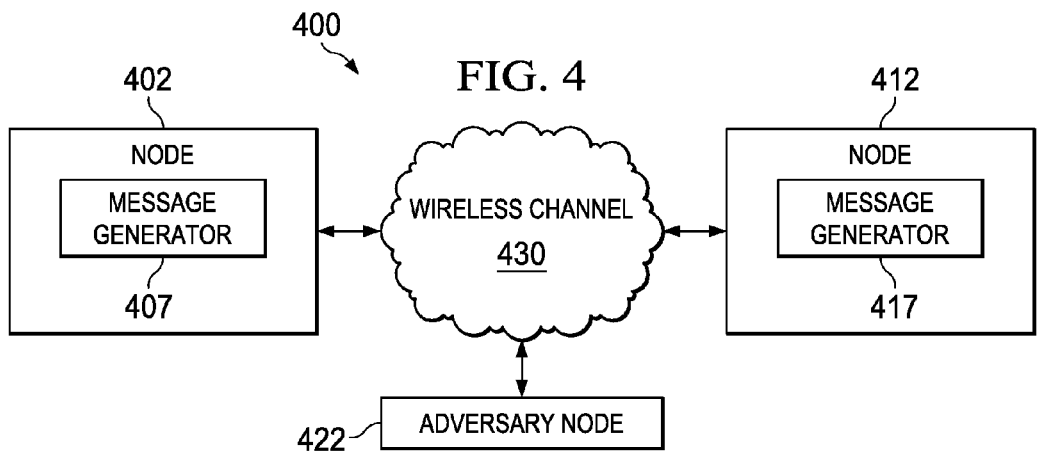

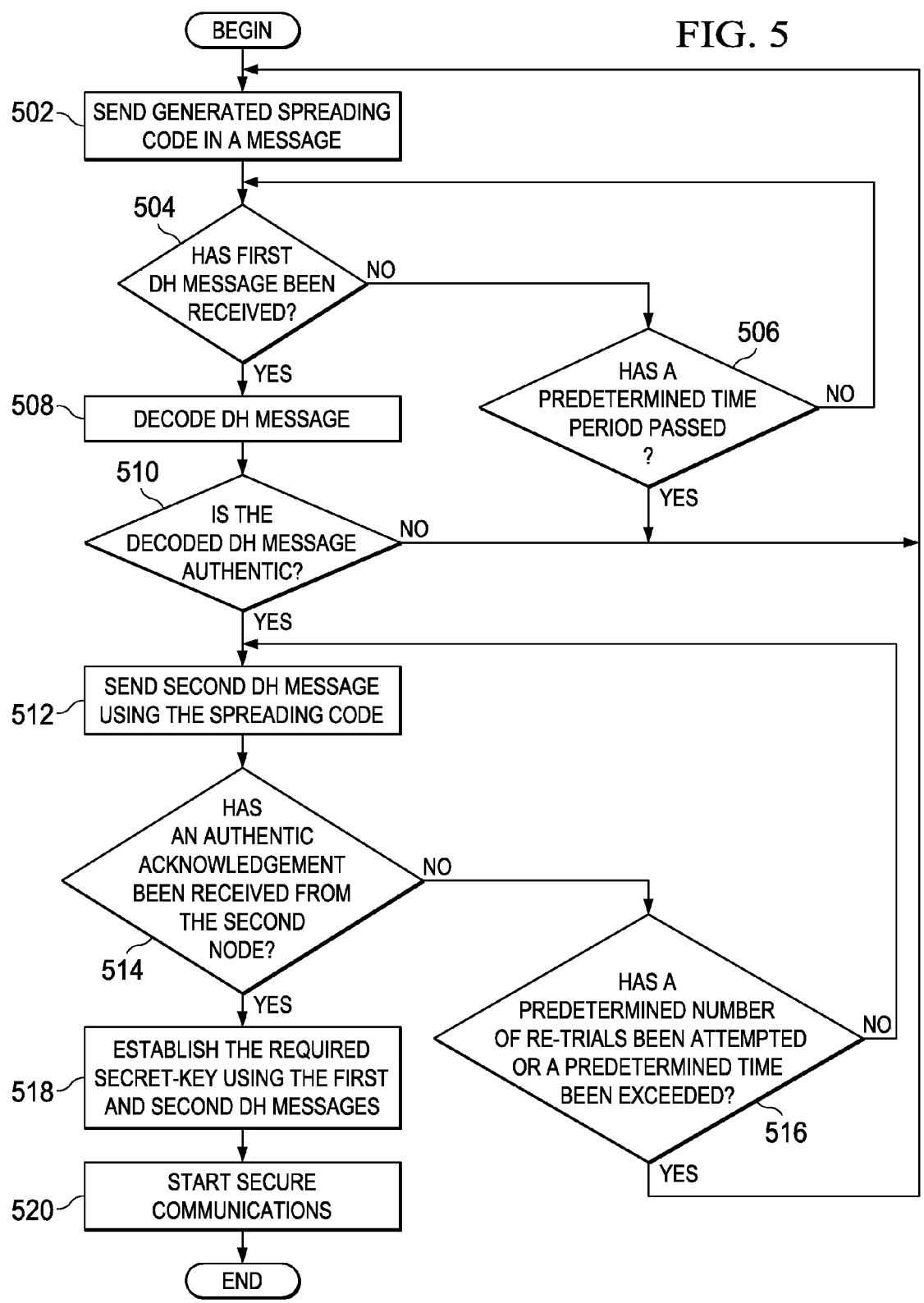

SECRET-KEY EXCHANGE FOR WIRELESS AND SENSOR NETWORKS

This invention was made with United States Government support under Contract No. W911NF-06-3-0001 awarded by the United States Army. The Government has certain rights in this invention.

BACKGROUND

The present application relates generally to an improved data processing apparatus and method and more specifically to mechanisms for secret-key exchange for wireless and sensor networks.

In contrast to current infrastructure-based networks (such as present-day cellular systems), the next generation of wireless and sensor networks will have self-organization capabilities where a group of nodes setup a customized ad hoc network on demand, such as people at trade-shows/conferences connect together to form an ad hoc network for information sharing, an emergency response ad hoc network being setup on demand in the field, or a group of (mobile) sensor nodes being put to use in a field on demand by creating an ad hoc network. One of the key problems in self-organization is setting up "secure" wireless channels between the nodes. State-of-the-art technologies to establish secure physical-layer wireless channels is provided through the use of code division multiple access (CDMA) or fast frequency hopping spread spectrum (FHSS) modulation techniques. However, the main requirement for these secure wireless channels is that the participating nodes must have a "shared secret-key" which is unknown to a potential attacker. Therefore, to bootstrap such networks, the first step in security is to establish a shared secret-key, since otherwise, by nature, a wireless channel is an open medium and the signals may be received by any transceiver, and will be prone to eavesdropping, jamming, and other disruption attacks. In addition to the above illustrative example, in most security bootstrapping mechanisms a shared secret-key is a necessary first requirement which must be first exchanged between the legitimate nodes.

Most known solutions to wireless secret-key exchange are adaptations of solutions for the wired networks. However, wireless channels are inherently different from wired channels and characterized by fading, unreliability, broadcast nature, etc. The widely used security mechanism in wired networks and current-day wireless systems is a Public-Key-Infrastructure (PKI) and adaptations of PKI. PKI schemes require a trusted central authority for key distribution and/or prior knowledge of users' public keys. Though pre-distribution of keys using trusted offline mechanisms can be achieved, such trusted offline mechanisms are very inefficient, incur a high security management overhead, and may be non-scalable for large networks with a dynamically changing membership. The other current state-of-the-art approach to on demand secret-key generation in the wired networks is the Diffie-Hellman (DH) protocol and variants of DH. The key steps of the DH algorithm require that two legitimate nodes wishing to establish a secret-key first exchange a set of open messages, and the key is then derived from these messages. However, exchanging the DH messages is very difficult over an open wireless channel in the presence of an active adversary due to smart jamming attacks, such as MAC layer attacks, which can cause a severe drop in throughput and practically block communication between the legitimate nodes.

SUMMARY

In one illustrative embodiment, a method, in a data processing system, is provided for establishing a shared secret-key for secure communication between nodes in a wireless network. The illustrative embodiment provides for a first node to provide a spreading code to a second node of the wireless network. The illustrative embodiment provides for the second node to provide a first input for the key establishment to the first node using communication encoded with the spreading code. The illustrative embodiment provides for the first node to provide a second input for the key establishment to the second node using communication encoded with the spreading code in response to obtaining the first input from the second node. The illustrative embodiment provides for the first node and the second node to establish the shared secret-key using the first input and the second input.

In other illustrative embodiments, a computer program product comprising a computer useable or readable medium having a computer readable program is provided. The computer readable program, when executed on a computing device, causes the computing device to provide a spreading code to a second node of the wireless network. The computer readable program further causes the computing device to receive a first input from the second node for the key establishment, where the second node uses communication encoded with the spreading code to generate the first input. The computer readable program further causes the computing device to provide a second input for the key establishment to the second node using communication encoded with the spreading code in response to obtaining the first input from the second node. The computer readable program further causes the computing device to establish the shared secret-key with the second node using the first input and the second input.

In yet another illustrative embodiment, a system/apparatus is provided. The system/apparatus may comprise one or more processors and a memory coupled to the one or more processors. The memory may comprise instructions which, when executed by the one or more processors, cause the one or more processors to provide a spreading code to a second node of the wireless network. The instructions further cause the processor to receive a first input from the second node for the key establishment, where the second node uses communication encoded with the spreading code to generate the first input. The instructions further cause the processor to provide a second input for the key establishment to the second node using communication encoded with the spreading code in response to obtaining the first input from the second node. The instructions further cause the processor to establish the shared secret-key with the second node using the first input and the second input.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary block diagram of a wireless communication device in which the present invention may be implemented;

FIG. 4 depicts a block diagram of the communication nodes and their functions under consideration in accordance with an illustrative embodiment;

FIG. 5 is an exemplary flow diagram of the operation performed by a first node in the Physical-Layer-Enhanced Key Exchange (PEK) system in accordance with one illustrative embodiment.

DETAILED DESCRIPTION

The illustrative embodiments provide a mechanism for an efficient and on demand exchange of a symmetric secret-key over a wireless channel for applications in emerging smart wireless and sensor networks. The utility of the symmetric secret-key enables an efficient, jam-resilient, secure, wireless channel over which higher-layer network mechanisms may be enabled. The mechanism provides a hierarchical two-step process that first exchanges a short key to setup a temporary wireless spread-spectrum channel over which key-exchange messages are efficiently shared to setup a longer size, more powerful, symmetric key. The mechanism utilizes techniques in cooperative networking to enhance the efficiency of the proposed two-step scheme by making it resilient against a large class of adversarial attacks and minimizing the communication cost incurred in the key exchange process.

Figure 1:
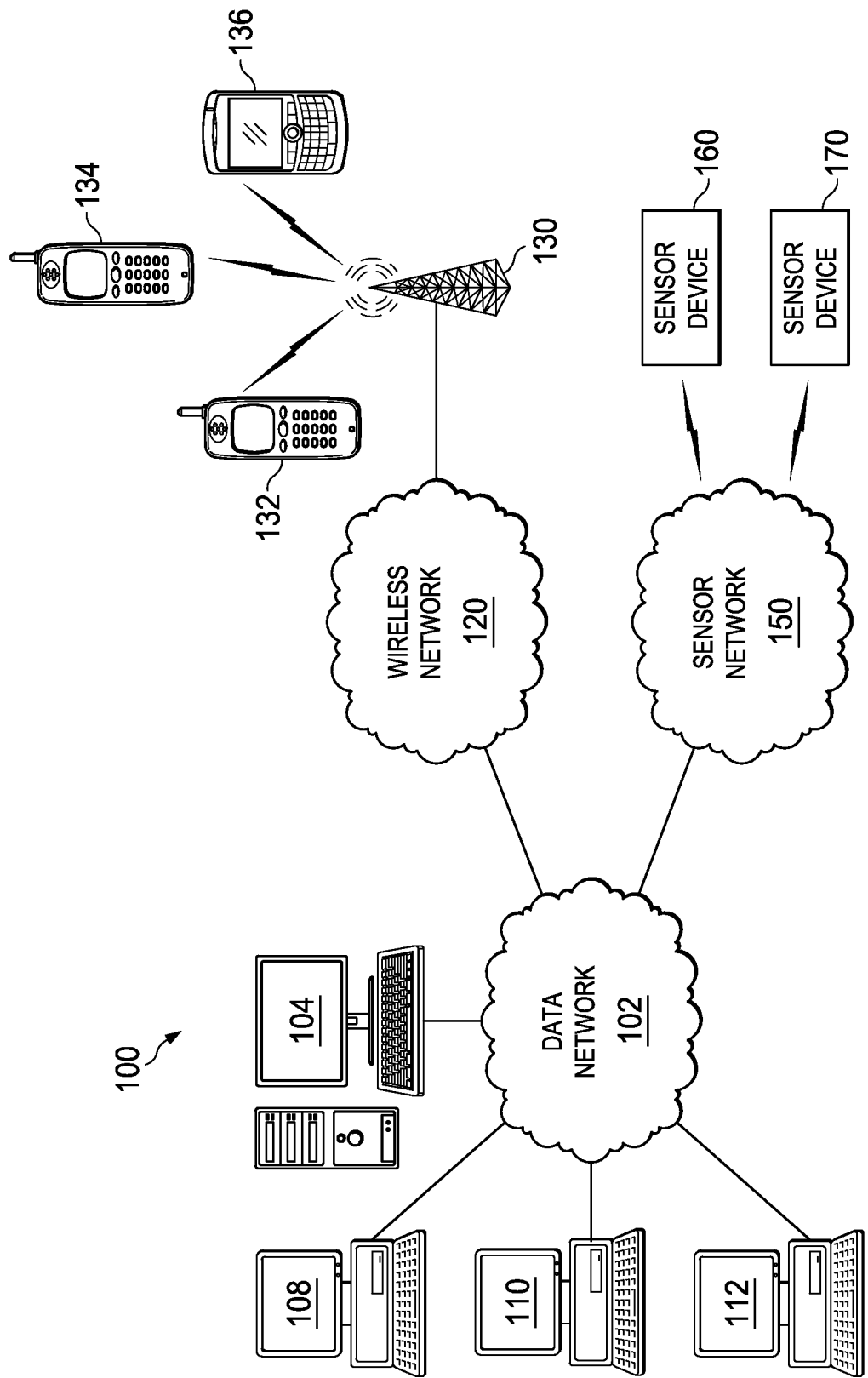
FIG. 1 is an exemplary diagram of a system of communication networks and communication devices in which exemplary aspects of the illustrative embodiments may be implemented.
Figure 2:
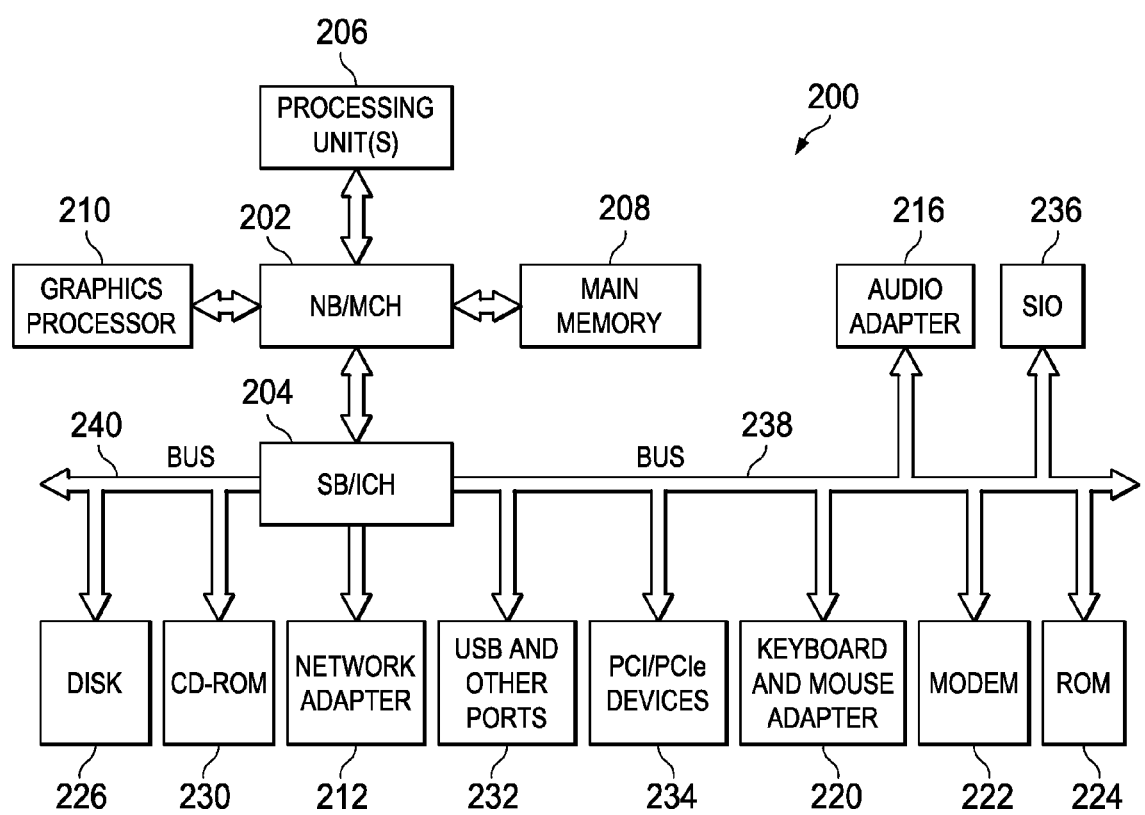
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a data processing device implementation of an efficient secret-key exchange protocol for sensor and wireless networks, this is only an example and is not intended to state or imply any limitation with regard to the features of the present invention. To the contrary, the illustrative embodiments are intended to include distributed data processing environments and embodiments in which an efficient secret-key exchange protocol may be established for sensor and wireless networks.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is an exemplary diagram of a system of communication networks and communication devices in which exemplary aspects of the illustrative embodiments may be implemented. As shown in FIG. 1, system 100 includes a plurality of networks 102, 120, and 150. In particular, data network 102, wireless network 120, and sensor network 150 are depicted. It should be noted that while only these three types of networks are depicted in FIG. 1, the present invention is not limited to only these types of networks or does not require the inclusion of all of these types of networks. Other types of communication networks may be used in addition to or in replacement of one or more of depicted networks 102, 120, and 150 without departing from the spirit and scope of the present invention.

Data network 102 may comprise one or more networks of the same or different types. For example, data network 102 may comprise one or more local area networks (LANs), wide area networks (WANs), the Internet, and the like. Similarly, wireless network 120 and sensor network 150 may comprise one or more networks of the same or different types. Essentially, any number and type or combination of types of communication networks may be used with the illustrative embodiments without departing from the spirit and scope of the present invention.

Each network 102, 120, and 150 has one or more communication devices coupled to it through either wired or wireless communication links. For example, data network 102 has server 104 and client devices 108-112 coupled to it via communication links generally known in the art. Client devices 108-112 preferably have the capability to perform one or more of voice telephone communications, electronic mail message communications, instant text message communications, and the like.

Wireless network 120 has a plurality of wireless communication devices 132, 134, and 136, which may be a cell phone, PDA, or the like, which communicate via wireless network 120 through wireless communication point 130, e.g., a cellular base station, wireless access point, or the like. Wireless communication devices 132, 134, and 136 may be, for example, wireless telephones, personal digital assistants, pagers, or the like. Wireless communication devices 132, 134, and 136 preferably have the capability to perform one or more of voice telephone communications, electronic mail message communications, instant text message communications, or the like. Sensor network 150 has a plurality of wireless sensor devices 160 and 170, which communicate via sensor network 150. Wireless sensor devices 160 and 170 preferably have the capability to sense a change, such as temperature, voltage, or the like and wirelessly transmit the detected change via sensor network 150. Thus, sensor network 150 and wireless network 120 are networks in which messages, communications, information, or the like may be communicated between devices and such messages, communications, information, or the like may be essentially any type of data.

With reference now to FIG. 2, a block diagram of an example data processing system is shown in which aspects of the illustrative embodiments may be implemented. Data processing system 200 is an example of a device, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

FIG. 3 is an exemplary block diagram of a wireless communication device in which the present invention may be implemented. Wireless communication device 300 includes a processor 302 for controlling operation of wireless communication device 300 and a memory 304. The processor 302 may be a general-purpose microprocessor operating under the control of instructions stored in a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a keypad and/or buttons. Display 316 may be any type of display device including a liquid crystal display (LCD) or other known displays, such as a cathode ray tube or active matrix display.

Transmitter 308 and receiver 310 are coupled to a telephone signal by couple 324 to provide full duplex communication. The telephone signal may be provided by a telephone line (not shown) in a land-based telephone or an antenna, such as for a wireless telephone. Audio processing circuit 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system without departing from the spirit and scope of the present invention.

Moreover, the data processing system 200 in FIG. 2 and wireless communication device 300 in FIG. 3 may take the form of any of a number of different data processing systems including client computing devices, server computing devices, a tablet computer, laptop computer, telephone or other communication device, a personal digital assistant (PDA), wireless sensors, or the like. In some illustrative examples, data processing system 200 and wireless communication device 300 may be a portable computing device which is configured with flash memory to provide non-volatile memory for storing operating system files and/or user-generated data, for example. Essentially, data processing system 200 and wireless communication device 300 may be any known or later developed data processing system without architectural limitation. The illustrative embodiments provide a mechanism for an efficient secret-key exchange protocol for sensor and wireless networks, such as networks 102, 120, and 150 of FIG. 1.

FIG. 4 depicts a block diagram of the communication nodes and their functions under consideration in accordance with an illustrative embodiment. In FIG. 4, efficient secure wireless communication system 400 comprises node 402 and node 412 and a wireless channel 430 typically requires node 402 and node 412 to share a secret-key for bootstrapping a secure wireless channel and enabling higher-layer security mechanisms, which is achieved through the proposed method in the illustrative embodiment.

The illustrative embodiments refer to the proposed method for secret-key exchange as the Physical-Layer-Enhanced Key Exchange (PEK) method. The goal of the illustrative embodiments is to minimize the communication cost incurred in the key exchange protocol by reducing the number of messages exchanged over an open wireless channel through setting up temporary, jam-resilient, spread-spectrum channels. To achieve this, the illustrative embodiments exploit physical layer characteristics of wireless channels and inherent statistical variations in their quality. The illustrative embodiments utilize three physical-layer techniques: short spreading-code exchange packets, cooperative jamming (cooperative noise generation), and role-switching. The short spreading-code exchange sends a short code to setup a temporary spread-spectrum channel, such as a code division multiple access (CDMA) channel or fast frequency hopping spread spectrum (FESS) (or other such variants/physical-layer modulations). The cooperative jamming technique introduces artificial noise in the environment to make the channel conditions unpredictable and unreliable for an adversary. Lastly, role-switching makes the process symmetrical between the legitimate node-pairs so that an adversary does not exploit asymmetry in the protocol. In the illustrative embodiments, the physical layer techniques of cooperative jamming and role switching is first described, and then details of cooperative jamming and role switching applicability in the proposed PEK secret-key exchange method is described.

The proposed cooperative jamming technique considers a second antenna on node 402 (or, alternatively, a closely located helper node with equivalent capabilities as node 402) which may transmit noise into wireless channel 430 when required. Consider now node 402 sending a packet to node 412 in the presence of adversary node 422. A transmitted packet is lost (not received) if the received signal-to-interference-and-noise ratio (SINR) is below a certain threshold, while the packet is successfully received if the SINR is above the threshold. Let the packet sent by node 402 be received only by node 412 and not by the adversary node 422, i.e., the packet message qualifies as a secret message. This happens when the SINR at node 412 is above the required threshold and the SINR at the adversary node 422 is below the required threshold. The chance of a secret packet transfer between node 402 and node 412 thus depends on the SINR values at node 412 and the adversary node 422. The SINR values in turn depend on the mutual distances with higher values at closer distances and lower values otherwise.

When both node 412 and adversary node 422 are at comparable distance from node 402, a secret packet transfer may take place with sufficient likelihood. However, the case when an adversary node 422 is situated close to node 402 as compared to the distance between node 402 and node 412, adversary node 422 is at an advantage with higher SINR values. Thus, reducing the chance of secret packet transfer between node 402 and node 412. This is referred to as the near-far case. The technique of cooperative jamming solves the near-far case: when node 402 transmits a packet, the second antenna (or helper node close to 402) transmits random signal (or noise) on the wireless channel. This increases the noise in the environment which decreases with distance. While adversary node 422 receives a stronger signal it also suffers stronger noise. On the other hand, node 412 is not as affected by this artificial noise because node 412 is further away. Thus, the use of cooperative jamming works by leveling out the difference between the SINR values of node 412 and adversary node 422. Using a second antenna as a cooperative-jammer in a multi-antenna system requires very limited additional complexity.

The technique of role-switching is to reduce the effect of active signal jamming by an adversary. Consider again node 402 sending a packet to node 412 in the presence of adversary node 422. As discussed in the previous paragraph, adversary node 422 being closer to the transmitting node 402 than node 412 (referred to as the near-far case) has a SINR advantage, but using cooperative jamming this advantage may be removed. Now, consider the far-far case in which the adversary node 422 is closer to node 412 than node 402. By transmitting jamming noise, the adversary node 422 may reduce the SINR at the receiving node 412, thus reducing the chance of a secret packet transfer between node 402 and 412. This disadvantage may be removed by role-switching, where the nodes 402 and 412 alternatively become the transmitter and receiver to exchange a secret random packet. Role-switching may be achieved after every transmission trial or after a fixed number of trials.

Building upon the above physical layer techniques, the illustrative embodiment now considers the problem of secret-key exchange over a wireless channel 430 between nodes 402 and 412 in the presence of adversary node 422. While the illustrative embodiment presents the proposed PEK secret-key exchange method using the example of Elliptic Curve Cryptography based Diffie-Hellman (ECC-DH) protocol adapted to the wireless context, the PEK method is not limited to only the DH protocol for shared secret-key generation. That is, the illustrative embodiment may employ other protocols without departing from the spirit and scope of the present invention.

Again as an illustration, nodes 402 and 412 each have a public-private key and there is a certification authority (CA) that provides certificates to bind node identities to their respective keys. The presence of public-private keys and CA is not a necessary requirement and it is used here for the nodes 402 and 412 to verify each other's authenticity. Any other mechanism of verifying the authenticity could be equally applicable to the proposed method, and in addition, if not required, the step of verifying authenticity could be removed in the illustrative embodiment. While nodes 402 and 412 hold their own public-private key and the credentials of the CA, nodes 402 and 412 do not have valid public keys of each other or other network nodes. This is generally true for large networks and/or with dynamically changing network membership, where it would be practically ineffective for every node to pre-store credentials (or shared secrets) with other network nodes.

As an illustration, consider first the basic ECC-DH protocol for key exchange without the proposed enhancements, which is referred to as the Direct Method in the illustrative embodiment. This protocol requires two message transfers: one from node 402 to node 412, and the other from node 412 to node 402, which are denoted as $DH_A$ and $DH_B$, respectively. Typically, message $DH_A$ consists of $PK_A$ (public-key of node 402), CA's signature of node 402's credentials, $Sig_{CA}$, the credential $r_A$ of the DH protocol (node 402's random number), node 402's identity and a time-stamp $t_A$ (to avoid a replay attack), and finally node 402's signature on this message, $Sig_A$, which may be generated by message generator 407. Assuming a 128-bit security throughout, these components are roughly of the following sizes in bits: $|PK_A|=256$, $|Sig_{CA}|=256$, $|r_A|=256$, $|Sig_A|=256$, plus small number of bits needed for encoding node 402's identity and time-stamp $t_A$. Thus, the size of $DH_A$ message is roughly 1024 bits. The message from node 412 to node 402 is symmetrical to $DH_A$ and would be roughly of size 1024 bits, generated by message generator 417. Note, the above sizes are directly related to the security level chosen, and if the security level is increased from 128-bit to 256-bit, message sizes increase proportionately. Under the Direct Method, node 402 repeatedly transmits message $DH_A$ until node 412 successfully receives it, and vice-versa, node 412 transmits message $DH_B$ until node 402 successfully receives it.

It is intuitive that, under a jamming adversary, the number of transmissions needed to establish a secret-key for the Direct Method is very high since the nodes 402 and 412 lack an efficient channel to guard their communication against jamming. However, as discussed earlier, there is a circular dependency since establishing such a channel using spread spectrum modulation techniques requires a secret-key. Therefore, the proposed PEK method in the illustrative embodiments first establishes an ephemeral spread-spectrum channel using short spreading-code packet exchanges based on the discussed physical layer techniques, and then exchanges the long ECC-DH messages over the ephemeral channel to finally establish the long secret-key.

Aspects of the present invention are now described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
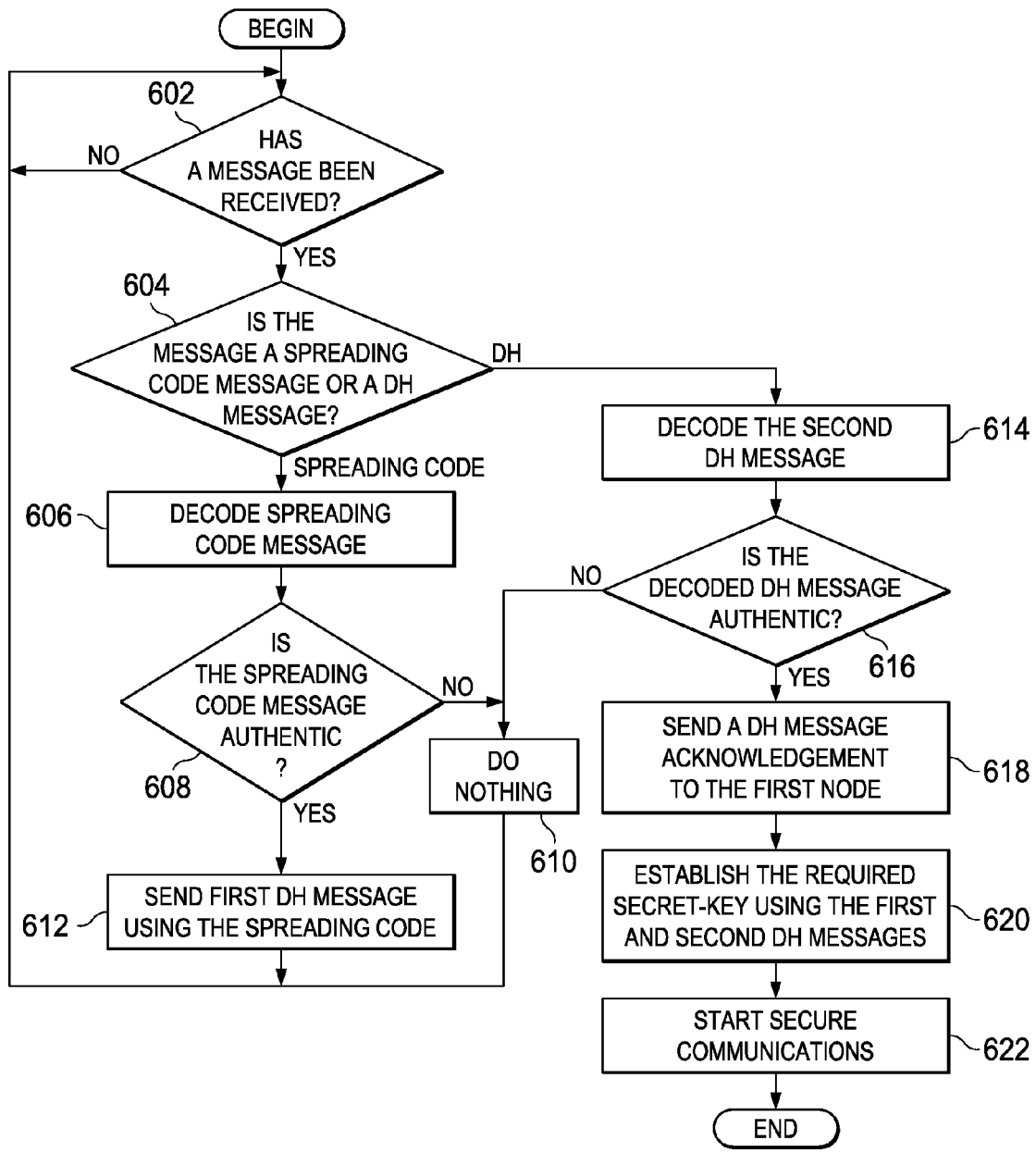
FIG. 6 is an exemplary flow diagram of the operation performed by a second node in the PEK system in accordance with one illustrative embodiment.

Referring now to FIGS. 5 and 6, these figures provide flowcharts outlining example operations of the Physical-Layer-Enhanced Key Exchange (PEK) mechanism in accordance with an illustrative embodiment. For illustration, the PEK method utilizes the ECC-DH protocol, but any other cryptographic key exchange may also be used without departing from the spirit of the invention, in which case the message exchanges for key generation will be appropriately changed. FIG. 5 is an exemplary flow diagram of the operation performed by a first node in the PEK system in accordance with one illustrative embodiment. Before the operation begins, it is assumed that the necessary steps needed for initiating communication between two devices, a first node and a second node, have taken place. These steps may include, among others, synchronization, radio frequency (RF) tuning, initial signaling, initial protocol handshakes, or the like. As the operation begins, the first node sends a message that comprises a generated spreading code to a second node (step 502). The first node then determines whether a first DH message, $DH_B$, is received from the second node (step 504). Without departing from the spirit of the invention, this step may be split into two steps, where the first node first receives an acknowledgement of the spreading code from step 502, and then the first DH message. If at step 504 the first node fails to receive the first DH message, the first node determines whether a predetermined time period has passed (step 506). If at step 506 the predetermined time period has not passed, then the operation returns to step 504. If at step 506 the predetermined time period has passed, then the operation returns to step 502. If at step 504 the first node receives the first DH message, then the first node decodes the first DH message (step 508).

The first node determines whether the DH message has been successfully decoded and is authentic (step 510). If at step 510 the DH message is unsuccessfully decoded or is not authentic, then the operation returns to step 502. If at step 510 the decoded DH message is authentic, then the first node sends a second message, $DH_A$, to the second node using the generated spreading code (step 512). The first node then waits for an authentic acknowledgement from the second node (step 514). If at step 514 an authentic acknowledgement has not been received, the first node checks if a predetermined number of re-trials has been attempted or a predetermined time has been exceeded (step 516). If at step 516 the predetermined number of re-trials has not been attempted or the predetermined time has not been exceeded, the first node re-sends the second DH message, $DH_A$ (step 512). If at step 516 the predetermined number of re-trials has been attempted or the predetermined time has been exceeded, then the operation returns to step 502. If at step 514 an authentic acknowledgement has been received, the first node then establishes the required secret-key using the first and second DH messages (step 518). Finally, the first node starts secure communications with the second node (step 520), with the operation ending thereafter.

FIG. 6 is an exemplary flow diagram of the operation performed by a second node in the PEK system in accordance with one illustrative embodiment. As the operation begins, the second node determines whether a message has been received (step 602). If at step 602 no message has been received, then the operation returns to step 602. If at step 602 a message has been received, then the second node determines whether the message is a spreading code message or a DH message (step 604). If at step 604 the message is a spreading code message, then the second node decodes the spreading code message (step 606). The second node determines whether the spreading code message is authentic (step 608). If at step 608 the decoded spreading code message is not authentic, then the second node does nothing (step 610) and the operation returns to step 602. If at step 608 the decoded spreading code message is authentic, then the second node sends a first message, $DH_B$, to the first node using the spreading code (step 612), with the operation returning to step 602 thereafter.

If at step 604 the message is a DH message, then the second node decodes the second DH message, $DH_A$ (step 614). The second node determines whether the decoded DH message is authentic (step 616). If at step 616 the decoded DH message is not authentic, then the operation proceeds to step 610. If at step 616 the decoded DH message is authentic, then the second node sends a DH message acknowledgement to the first node (step 618). The second node then establishes the required secret-key using the first and second DH messages (step 620). Finally, the second node starts secure communications with the first node (step 622), with the operation ending thereafter.

During operation of step 502 of FIG. 5, the first node may utilize the technique of cooperative jamming to send the short generated spreading code, as illustrated earlier in the embodiment. The operations performed by the first node and the second node may be interchanged (role-switching) at every predetermined number of retrials when the operation fails and/or the flow returns to the begin step.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for establishing a shared secret-key for secure communication between nodes in a wireless network, the method comprising:

providing, by a first node in the wireless network, a spreading code to a second node of the wireless network;

providing, by the second node, a first input for the key establishment to the first node using communication encoded with the spreading code;

responsive to obtaining the first input from the second node, providing, by the first node, a second input for the key establishment to the second node using communication encoded with the spreading code; and establishing, by the first node and the second node, the shared secret-key using the first input and the second input.

2. The method of claim 1, wherein the steps of providing the spreading code, the first input, and the second input further comprise:
sending, by the first node and the second node, messages from the respective nodes containing the respective information over the wireless network.

3. The method of claim 2, further comprising:
sending, by the first node and the second node, the messages between the respective nodes utilizing cooperative noise generation by at least one of a cooperative third node, a cooperative antenna on the first node, or a cooperative antenna on the second node.

4. The method of claim 2, further comprising:
determining, by the first node, whether a first message for key generation in the first input is received from the second node;
responsive to receiving the first message for key generation, decoding, by the first node, the first message;
determining, by the first node, whether the first message for key generation has been successfully decoded and is authentic;
responsive to the first message for key generation being successfully decoded and being authentic, sending, by the first node, a second message for key generation in the second input to the second node using communication encoded by the spreading code; and
responsive to receiving an authentic acknowledgement of the second message from the second node, establishing, by the first node, the shared secret-key using only the first message and the second message for key generation.

5. The method of claim 4, further comprising:
responsive to failing to receive the first message for key generation from the second node, sending, by the first node, a new message that comprises a new spreading code to the second node, wherein the new message is sent after a predetermined amount of time has expired.

6. The method of claim 4, further comprising:
responsive to the first message for key generation being unsuccessfully decoded or not being authentic, sending, by the first node, a new message that comprises a new spreading code to the second node.

7. The method of claim 4, further comprising:
responsive to failing to receive the authentic acknowledgement of the second message for key generation from the second node, resending, by the first node, the second message to the second node using communication encoded with the spreading code.

8. The method of claim 7, further comprising:
responsive to a failure to receive the authentic acknowledgement of the second message for key generation from the second node after a predetermined number of resends, sending, by the first node, a new message that comprises a new spreading code to the second node.

9. The method of claim 7, further comprising:
responsive to a failure to receive the authentic acknowledgement of the second message for key generation from the second node after a predetermined time has expired, sending, by the first node, a new message that comprises a new spreading code to the second node.

10. The method of claim 4, further comprising:
determining, by the second node, whether the spreading code has been received or the second message for key generation has been received;
responsive to receiving the spreading code, decoding, by the second node, the spreading code;
determining, by the second node, whether the spreading code is authentic; and
responsive to the spreading code being authentic, sending, by the second node, the first message for key generation to the first node using communication encoded with the spreading code.

11. The method of claim 10, further comprising:
responsive to receiving the second message for key generation, decoding, by the second node, the second message;
determining, by the second node, whether the second message for key generation has been successfully decoded and is authentic;
responsive to the second message for key generation being successfully decoded and being authentic, sending, by the second node, an acknowledgement of the second message to the first node; and
establishing, by the second node, the shared secret-key using only the first message and second message for key generation.

12. A computer program product comprising a non-transitory computer readable storage medium having a computer readable program stored therein, wherein the computer readable program, when executed on a computing device, causes the computing device to:
provide a spreading code to a second node of the wireless network;
receive a first input from the second node for the key establishment, wherein the second node uses communication encoded with the spreading code to generate the first input;
responsive to obtaining the first input from the second node, provide a second input for the key establishment to the second node using communication encoded with the spreading code; and
establish the shared secret-key with the second node using the first input and the second input.

13. The computer program product of claim 12, wherein the spreading code, the first input, and the second input are sent using messages from the respective nodes containing the respective information over the wireless network.

14. The computer program product of claim 13, wherein the messages are sent between the respective nodes utilizing cooperative noise generation by at least one of a cooperative third node, a cooperative antenna on the first node, or a cooperative antenna on the second node.

15. The computer program product of claim 13, wherein the computer readable program further causes the computing device to:
determine whether a first message for key generation in the first input is received from the second node;
responsive to receiving the first message for key generation, decode the first message;
determining whether the first message for key generation has been successfully decoded and is authentic;
responsive to the first message for key generation being successfully decoded and being authentic, send a second message for key generation in the second input to the second node using communication encoded by the spreading code; and
responsive to receiving an authentic acknowledgement of the second message from the second node, establish the shared secret-key using only the first message and the second message for key generation.

16. The computer program product of claim 15, wherein the computer readable program further causes the computing device to:
- responsive to failing to receive the first message for key generation from the second node, send a new message that comprises a new spreading code to the second node, wherein the new message is sent after a predetermined amount of time has expired;
- responsive to the first message for key generation being unsuccessfully decoded or not being authentic, send a new message that comprises a new spreading code to the second node;
- responsive to failing to receive the authentic acknowledgement of the second message for key generation from the second node, resend the second message to the second node using communication encoded with the spreading code;
- responsive to a failure to receive the authentic acknowledgement of the second message for key generation from the second node after a predetermined number of resends, sending a new message that comprises a new spreading code to the second node; and
- responsive to a failure to receive the authentic acknowledgement of the second message for key generation from the second node after a predetermined time has expired, send a new message that comprises a new spreading code to the second node.

17. The computer program product of claim 15, wherein the computer readable program further causes the computing device to:
- determine whether the spreading code has been received or the second message for key generation has been received;
- responsive to receiving the spreading code, decode the spreading code;
- determine whether the spreading code is authentic; and
- responsive to the spreading code being authentic, send the first message for key generation to the first node using communication encoded with the spreading code.

18. The computer program product of claim 17, wherein the computer readable program further causes the computing device to:
- responsive to receiving the second message for key generation, decode the second message;
- determine whether the second message for key generation has been successfully decoded and is authentic;
- responsive to the second message for key generation being successfully decoded and being authentic, send an acknowledgement of the second message to the first node;
- establish the shared secret-key using only the first message and second message for key generation.

19. An apparatus, comprising:
a processor; and
a memory coupled to the processor, wherein the memory comprises instructions which, when executed by the processor, cause the processor to:
- provide a spreading code to a second node of the wireless network;
- receive a first input from the second node for the key establishment, wherein the second node uses communication encoded with the spreading code to generate the first input;
- responsive to obtaining the first input from the second node, provide a second input for the key establishment to the second node using communication encoded with the spreading code; and
- establish the shared secret-key with the second node using the first input and the second input.

20. The apparatus of claim 19, wherein the spreading code, the first input, and the second input are sent using messages from the respective nodes containing the respective information over the wireless network.

21. The apparatus of claim 20, wherein the messages are sent between the respective nodes utilizing cooperative noise generation by at least one of a cooperative third node, a cooperative antenna on the first node, or a cooperative antenna on the second node.

22. The apparatus of claim 20, wherein the instructions further cause the processor to:
- determine whether a first message for key generation in the first input is received from the second node;
- responsive to receiving the first message for key generation, decode the first message;
- determining whether the first sage for key generation has been successfully decoded and is authentic;
- responsive to the first message for key generation being successfully decoded and being authentic, send a second message for key generation in the second input to the second node using communication encoded by the spreading code; and
- responsive to receiving an authentic acknowledgement of the second message from the second node, establish the shared secret-key using only the first message and the second message for key generation.

23. The apparatus of claim 22, wherein the instructions further cause the processor to:
- responsive to failing to receive the first message for key generation from the second node, send a new message that comprises a new spreading code to the second node, wherein the new message is sent after a predetermined amount of time has expired;
- responsive to the first message for key generation being unsuccessfully decoded or not being authentic, send a new message that comprises a new spreading code to the second node;
- responsive to failing to receive the authentic acknowledgement of the second message for key generation from the second node, resent the second message to the second node using communication encoded with the spreading code;
- responsive to a failure to receive the authentic acknowledgement of the second message for key generation from the second node after a predetermined number of resends, send a new message that comprises a new spreading code to the second node; and
- responsive to a failure to receive the authentic acknowledgement of the second message for key generation from the second node after a predetermined time has expired, send a new message that comprises a new spreading code to the second node.

24. The apparatus of claim 22, wherein the instructions further cause the processor to:
- determine whether the spreading code has been received or the second message for key generation has been received;
- responsive to receiving the spreading code, decode the spreading code;
- determine whether the spreading code is authentic; and
- responsive to the spreading code being authentic, send the first message for key generation to the first node using communication encoded with the spreading code.

25. The apparatus of claims 24, wherein the instructions further cause the processor to:

responsive to receiving the second message for key generation, decode the second message;
determine whether the second message for key generation has been successfully decoded and is authentic;
responsive to the second message for key generation being successfully decoded and being authentic, send an acknowledgement of the second message to the first node; and
establish the shared secret-key using only the first message and second message for key generation.

* * * * *